United States Patent [19]

Breuer et al.

[11] Patent Number: 5,480,621
[45] Date of Patent: * Jan. 2, 1996

[54] ELECTRICALLY CONDUCTIVE HONEYCOMB AS AN EXHAUST GAS CATALYST CARRIER BODY

[75] Inventors: Hans-Jürgen Breuer, Overath; Theodor Cyron, Bergisch Gladbach; Wolfgang Maus, Bergisch Gladbach; Helmut Swars, Bergisch Gladbach; Ludwig Wieres, Overath, all of Germany

[73] Assignee: Emitec Gesellschaft fuer Emissionstechnologie mbH, Lohmar, Germany

[*] Notice: The portion of the term of this patent subsequent to Jun. 21, 2011, has been disclaimed.

[21] Appl. No.: 54,348

[22] Filed: Apr. 27, 1993

Related U.S. Application Data

[62] Division of Ser. No. 604,199, Oct. 25, 1990, Pat. No. 5,322,672.

[30] Foreign Application Priority Data

Apr. 25, 1988 [DE] Germany .......................... 38 13 928.6

[51] Int. Cl.⁶ .............................. B01D 53/92; F01N 3/10; F01N 3/28
[52] U.S. Cl. .............................. 422/174; 422/180; 55/520; 55/521; 55/524; 96/154
[58] Field of Search ............................. 392/485; 219/552, 219/553; 96/146, 154; 55/520, 521, 524; 422/174, 177, 169, 180

[56] References Cited

U.S. PATENT DOCUMENTS

| | | | |
|---|---|---|---|
| 1,789,812 | 1/1931 | Frazer | 423/213.5 |
| 3,723,070 | 3/1973 | Houdry | 422/105 |
| 3,768,982 | 10/1973 | Kitzner et al. | 422/174 |
| 3,770,389 | 10/1973 | Kitzner et al. | 422/174 |
| 3,889,464 | 6/1975 | Gardner | 422/173 X |
| 4,272,668 | 6/1981 | Johnson et al. | 219/375 |
| 4,647,435 | 3/1987 | Nonnenmann | 422/180 |
| 4,686,827 | 8/1987 | Wade et al. | 422/174 X |

(List continued on next page.)

FOREIGN PATENT DOCUMENTS

| | | |
|---|---|---|
| 0049489 | 6/1985 | European Pat. Off. |
| 0188075 | 7/1986 | European Pat. Off. |
| 0121174 | 9/1986 | European Pat. Off. |
| 0121175 | 1/1987 | European Pat. Off. |
| 0233860 | 8/1987 | European Pat. Off. |
| 0244061 | 11/1987 | European Pat. Off. |
| 0245737 | 8/1989 | European Pat. Off. |
| 0245738 | 8/1989 | European Pat. Off. |
| 470389 | 12/1928 | Germany . |
| 563757 | 10/1932 | Germany . |
| 1476486 | 10/1969 | Germany . |
| 2251631 | 5/1973 | Germany . |
| 2230663 | 3/1975 | Germany . |
| 2415452 | 7/1987 | Germany . |
| 1469527 | 4/1977 | United Kingdom . |

OTHER PUBLICATIONS

SAE Technical Paper Series Publ. No. 902115 (1990) "Air Injection to an Electrically–Heated Catalyst".

*Primary Examiner*—Robert J. Warden
*Assistant Examiner*—E. Leigh Dawson
*Attorney, Agent, or Firm*—Herbert L. Lerner; Laurence A. Greenberg

[57] ABSTRACT

A honeycomb body assembly, in particular a catalyst carrier body, includes at least one electrically heatable honeycomb body having layered metal sheets forming a stack with a plurality of channels through which a fluid can flow. The metal sheets have a thickness of about 0.03 to 0.12 mm. The honeycomb body is electrically subdivided with regard to its cross-section or in its axial direction. At least one electric current path is formed through the metal sheets with an electric resistance of between 0.01 and 2 Ω. The resistance, which is dependent on the temperature, can be used for monitoring and regulating the honeycomb assembly.

33 Claims, 8 Drawing Sheets

U.S. PATENT DOCUMENTS

| | | | |
|---|---|---|---|
| 4,741,082 | 3/1988 | Kanniainen et al. | 422/180 X |
| 4,793,136 | 12/1988 | Whittenberger | 422/180 X |
| 4,803,189 | 2/1989 | Swars | 502/439 |
| 4,923,109 | 5/1990 | Cyron | 422/180 X |
| 4,976,929 | 12/1990 | Cornelius et al. | 422/174 |
| 5,063,029 | 11/1991 | Mizuno et al. | 422/175 |
| 5,322,672 | 6/1994 | Breuer et al. | 422/180 |

ELECTRICALLY CONDUCTIVE HONEYCOMB AS AN EXHAUST GAS CATALYST CARRIER BODY

This is a division of application Ser. No. 07/604,199, filed Oct. 25, 1990, now U.S. Pat. No. 5,322,672.

CROSS-REFERENCE TO RELATED APPLICATION

The application is a continuation of International Application PCT/EP 89/00439, filed Apr. 21, 1989, which designated the United States of America.

SPECIFICATION

The invention relates to an electrically conductive honeycomb body, in particular to a carrier body for exhaust gas catalysts, including wound, stacked or otherwise layered layers of high-temperature corrosion-proof metal sheets, at least some of them structured, which form a plurality of channels through which a fluid can flow, as well as methods for its operation and monitoring.

The essential features of the honeycomb bodies according to the invention will be discussed below in conjunction with the advantages of their use as catalyst carrier bodies, but this does not preclude other comparable uses. For instance, such honeycomb bodies can be used for heating fluids, evaporating liquids, and so forth.

Based on the widely known prior art in motor vehicle catalysts, namely the regulated three-way catalyst, the exemplary embodiments of the present invention address the accelerating of the response, the regulation and monitoring of such catalyst apparatus.

In many cases, to reduce the toxic emissions in the cold-starting phase of a motor vehicle, so-called starting catalysts or precatalysts were previously used. Such starting catalysts, installed near the engine and having metal support structures, are heated faster than the relatively bulky main catalysts, because they are disposed closer to the engine and have a smaller volume.

Nevertheless, even starting catalysts require a certain amount of time until they respond, because their catalytically active mass, their ceramic carrier material, and the metal support structure must first be heated by the exhaust gas. In this process they first draw heat from the exhaust gas, causing the primary catalysts located farther along to heat more slowly to operating temperature.

As metal support structures, different variants of honeycomb bodies are known, which are described in detail in the following documents, as examples:

EP-C-O 049 489; EP-C-O 121 174; EP-C-O 121 175; EP-A-O 245 737; EP-A-O 245 738.

These patent documents particularly disclose so-called S-shaped honeycomb bodies and those having U-shaped sheet-metal layers.

Finally, it has also long been known that a metal honeycomb body can be heated electrically. This is described in German Patent DE-PS 563 757, for example. Other attempts to heat a catalyst body by an electrical heating element are known from German Published, Prosecuted Patent Application DE-AS 22 30 663. However, direct electrical heating of catalyst carrier bodies always met with great difficulties in the past, since the typical metal structures have an electrical resistance that is much too low for them to be used directly as heating bodies with the electrical voltages typical of and available in motor vehicles. German Patent DE-PS 563 757 therefore described only separate portions that may be embodied such that they have a suitable resistance. In German Published, Prosecuted Patent Application DE-AS 22 30 663, a separate heating element is used, which does not simultaneously act as a catalyst carrier body.

On the other hand, with spiral-wound honeycomb bodies, if the entire length of the wound-up sheet metal were used by suitable insulation of the sheet-metal layers, the resistance would be much too high, and would not allow an adequate current for the power required for heating.

It is accordingly an object of the invention to provide an electrically conductive honeycomb body and a method of monitoring and operating it as an exhaust gas catalyst carrier body, which overcomes the hereinafore-mentioned disadvantages of the heretofore-known methods and devices of this general type, and to modify the construction of a metal honeycomb body, with the goal of freely selecting its resistance within wide limits regardless of its volume, especially to enable easy heating of the honeycomb body using the voltage or current sources typically available in motor vehicles. Additionally, or instead, it should be possible by observing the temperature-dependent resistance of a honeycomb body to make a conclusion as to its temperature, and with this information to make regulation or monitoring processes possible.

With the foregoing and other objects in view there is provided, in accordance with the invention, a honeycomb body assembly, comprising at least one electrically heatable honeycomb body having layered metal sheets forming a stack with a plurality of channels through which a fluid can flow; the metal sheets have a thickness of substantially 0.03 to 0.12 mm; means are provided for electrically subdividing the honeycomb body for forming at least one electric current path through the metal sheets which has an electric resistance of substantially between 0.1 and 2 $\Omega$ or between 0.3 and 2 $\Omega$.

In accordance with a number of added features of the invention, the metal sheets are at least partly structured, high-temperature corrosion-proof metal sheets; the means are in the form of electrically insulating intermediate layers disposed between the stacks of metal sheets and/or they are in the form of gaps disposed along the axial length of the honeycomb body.

In accordance with another feature of the invention, the stacks are formed of wound layers of said metal sheets or of stacked layers of said metal sheets.

In accordance with a further feature of the invention, the metal sheets are either substantially smooth or corrugated, and the stacks are formed of alternating layers of smooth and corrugated metal sheets.

In accordance with an additional feature of the invention, the above-mentioned electric resistance is substantially between 0.1 and 1 $\Omega$, and in particular approximately 0.6 $\Omega$.

In accordance with again another feature of the invention, the thickness of said metal sheets is substantially 0.03 to 0.06 mm.

With the objects of the invention in view there is also provided, in accordance with the invention, a carrier body for exhaust gas catalysts, comprising layered layers of at least partly structured, high-temperature corrosion-proof metal sheets forming a plurality of channels through which a fluid can flow, insulating means disposed between said layered layers for electrically subdividing the carrier body cross-sectionally for forming at least one electric current path through said metal sheets having an electric resistance of substantially between 0.03 and 2 $\Omega$.

In accordance with again a further feature of the invention, the above-captioned means further subdivides the honeycomb body into subzones which are at least partly insulated from one another electrically, the subzones forming groups of at least one, and including electrical connecting bridges for electrically connecting the groups in series.

In accordance with again an additional feature of the invention, the stack includes at least four adjacent layers of the sheet-metal, and preferably 8 to 12 layers, through which current flows parallel.

In accordance with yet another feature of the invention, the adjacent sheet-metal layers are layered in meandering loops having reversing points and forming a body, and the means are in the form of intermediate layers electrically insulating the meandering loops from one another.

In accordance with yet a further feature of the invention, the stack is crimped in the regions of said reversing points where the at least four layers of sheet metal rest flat against one another.

In accordance with yet an added feature of the invention, reinforcement means are provided which are disposed in the region of the reversing points for lowering the electrical resistance thereof.

In accordance with yet an additional feature of the invention, the stacks form substantially U-shaped layers with ends which are electrically insulated from one another by the above means, including a supporting wall to which the ends are attached; the supporting wall includes a plurality of electrically conductive segments insulated from one another for electrically connecting at least two of the layers and for forming a series circuit through the layers.

In accordance with another feature of the invention, the stacks are disposed in the form of contrarily entwined sheets to form a body, and being provided with electrically insulating layers on the bottom and on the top of the stack, and wherein the metal sheets are mutually electrically conductive at least in the region of the, and including electrical connecting means for connecting the ends to the two poles of a current source.

In accordance with a further feature of the invention, the honeycomb body has a substantially circular cross-section with a given diameter, and the height of the stack is equal or less than one-third the diameter of the cross-section.

In accordance with an added feature of the invention, a plurality of honeycomb bodies in the form of disks is disposed in line with one another and connected electrically in parallel or in series.

In accordance with an additional feature of the invention, the means are in the form of granular ceramic material which may be applied to adjacent surfaces of the stacks by flame spraying; furthermore, the may be in the form of ceramic parts or in the form of ceramic fiber mats.

In accordance with again another feature of the invention, the honeycomb body is disposed in a metal jacket tube, and ceramic plates or platelets are brazed to the metal jacket tube for insulating the stacks from the jacket tube.

In accordance with again a further feature of the invention, a ceramic intermediate layer is disposed between two sheet metal layers for electrically insulating the two layers, and means are provided for forming a form-locking connection between said two sheet-metal layers for hindering axial displacement therebetween; the means may be in the form of of grooves or beads, or the like.

In accordance with again an added feature of the invention, the honeycomb body has two end faces and current flows therethrough in an axial direction, including at least one electrically highly conductive connecting strut disposed on at least one of the end faces for uniformly distributing the electrical current density over the cross-section of the honeycomb body. The honeycomb body may be disposed in a metal jacket tube, and the invention further discloses an electrically insulating duct disposed in the jacket tube, and an electrical supply line suitable for currents of between 50 and 400 A leading into the jacket tube through the insulating duct and being connected to the connecting strut; the supply line is high-temperature-proof and it is capable of absorbing relative movement between the connecting strut and the insulating duct which may be caused by differences in thermal expansion.

With the objects of the invention in view, there is further provided, in accordance with the invention, a method for operating and/or monitoring an electrically conductive catalyst carrier body which is at least partly insulated from its jacket and its retainers having a catalytically active coating and which is disposed in the exhaust gas system of an internal combustion engine; the method comprises measuring the electrical resistance of at least a subzone of the catalyst carrier body or the total electrical resistance and forming a measurement value, monitoring the measurement value, and, optionally, regulating the catalyst exhaust gas system in dependence of the measurement value.

In accordance with yet a further feature of the invention, a threshold resistance value is predetermined prior to the step of measuring the electrical resistance, and and the catalyst carrier body is electrically heated when the measurement value is below the predetermined threshold resistance value. The resistance, which is directly dependent on the temperature of the carrier body, may fall below the threshold value during operation, which means that the catalyst carrier body is reheated to the temperature slightly above the catalytically self-sustaining operating temperature.

In accordance with yet an additional feature of the invention, the measuring step is performed at given time intervals, and the measuring step is performed by at least briefly measuring the heat consumed by the catalyst carrier body or by measuring a quantity or variable which is proportional to the consumed heat capacity.

In summary, the present invention teaches that the honeycomb body should be subdivided electrically in its cross-sectional area and/or axial length by gaps and/or electrically insulating intermediate layers or coatings, in such a way that least one electric current path through the sheets having an electrical resistance between 0.03 and 2 $\Omega$ is created, preferably between 0.01 and 1 $\Omega$ and in particular approximately 0.6 $\Omega$. As will be described hereinafter in conjunction with the drawing, the number of gaps and/or intermediate layers required to attain a certain resistance is dependent on a plurality of the parameters. The thickness of the various sheets, their structure, the cross-sectional area of the various channels and the selection of material all have some influence. Metal sheets having a thickness of approximately 0.03 to 0.12 mm can be used, preferably 0.03 to 0.06 mm. Typical materials are steel sheets including chromium and aluminum components. Variant forms of electrically heatable catalyst carrier bodies are encompassed by the invention. One feature that they share is that they are subdivided, or separated from their jacket tube, by gaps and/or electrically insulating intermediate layers such that at least one electric current path through the catalyst carrier body results that has an electric resistance between 0.03 and 2 Ω. A resistance in this range is especially suitable for electric heating in conventional 12-volt systems. It should be taken into account here that at high currents, considerable losses can already arise in the supply lines, so that only a voltage of 10 V, for instance, may be present at the catalyst carrier body itself.

If a plurality of electrically heatable catalysts are present in a vehicle, then there are still different variants in electrical connection. Either the individual bodies may be constructed with a high resistance and then connected in parallel, or they have a relatively low electrical resistance and are correspondingly connected in series. Time-dependent switching from parallel circuits to series circuits may also be provided, if the electrical heating power is intended to be varied during the active heating period.

The high-temperature corrosion-proof sheet metal having a thickness of approximately 0.03 to 0.06 mm that is typically used would have an excessively high resistance for the intended electric heating over the entire length required for forming a catalyst carrier body. A catalyst carrier body in which all the structured sheets touch or are joined by joining techniques would have a resistance too low for electric heating with 12 V. As a result, a catalyst carrier body must be subdivided such that depending on its total volume a current path having a suitable combination of length and conductivity is produced. One option is to subdivide the cross section into electrically series-connected segments, which each comprise more than four parallel-connected sheet-metal layers, preferably from 8 to 12 layers.

Another option is to subdivide the catalyst carrier body into axially successive layers or disks, which are connected electrically in series. The two options may also be combined, as will be explained in conjunction with the exemplary embodiments and as it is set forth in the appended claims.

Some special features arise in installing the electrically heatable catalyst carrier body in a jacket tube, because here at least some parts of the catalyst carrier body must be electrically insulated from the jacket tube. Furthermore, suitable insulated ducts for the electric supply lines must also be provided. If jacket tubes assembled from half-shells are used, however, this does not present any great difficulty. The insulation between the catalyst carrier body and the jacket tube is capable of providing both thermal and electrical insulation simultaneously, which is particularly advantageous.

The invention also relates to versions having particular details for special applications. As will be described in further detail in conjunction with the drawing, it may be useful, in order to make the distribution of the current density in the honeycomb body more uniform, to provide connection struts on one or both face ends of a honeycomb body. Given the differences in relative expansions, and in particular thermal expansion, between the heatable honeycomb body and its jacket tube that must be expected, an electric feed line may have to be constructed elastically, to enable compensation for these expansions. Such a feed line should be designed for currents of 50 to 400 A as applicable.

If high axial mechanical strains of a honeycomb body are to be expected, it may be important for sheet-metal layers electrically insulated from one another to be hindered from axial displacement, by means of form-locking connections. A form-locking connection is one which is connects two elements together due to the shape of the elements themselves, as opposed to a force-locking connection, which locks the elements together by force external to the elements. Ceramic insulating layers are known not to withstand high tensile strains. A form-locking connection can help here to absorb the resultant forces. Particularly if the form-locking connection has a depth that is greater than the thickness of the insulating layer, then axial forces lead primarily to compressive strains of the ceramic intermediate layer in this zone, rather than to tensile strains.

When they are at least partly insulated with respect to their jacket and their retainers and are used, provided with a catalytically active coating, in the exhaust gas system of an internal combustion engine, electrically conductive catalyst carrier bodies, in particular those described above but including others, such as those made by powder metallurgy, can be monitored such that their total electrical resistance, or their electrical resistance in a subzone, is measured and used for monitoring and/or regulating the catalyst exhaust gas system. With increasing temperature, the electrical resistance of the honeycomb body increases as well. This can be exploited to monitor and regulate electric heating. Besides the fact that the heat capacity consumed by a catalyst carrier body drops if the applied voltage remains the same, the heating process can also be terminated as soon as the electrical resistance climbs above a predetermined threshold value and it can be initiated when the resistance drops below a predetermined threshold. Reheating of a catalyst, the operating temperature of which has dropped back below the ignition temperature for the catalytic reaction, for instance in a traffic jam, can be tripped by a resistance measurement. The heating current circuit itself can be used for resistance measurement, by being switched on briefly periodically and by measuring the heating capacity consumed or a variable proportional to this heating capacity.

Other features which are considered as characteristic for the invention are set forth in the appended claims.

Although the invention is illustrated and described herein as embodied in an electrically conductive honeycomb body, and method of monitoring and operating it as an exhaust gas catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
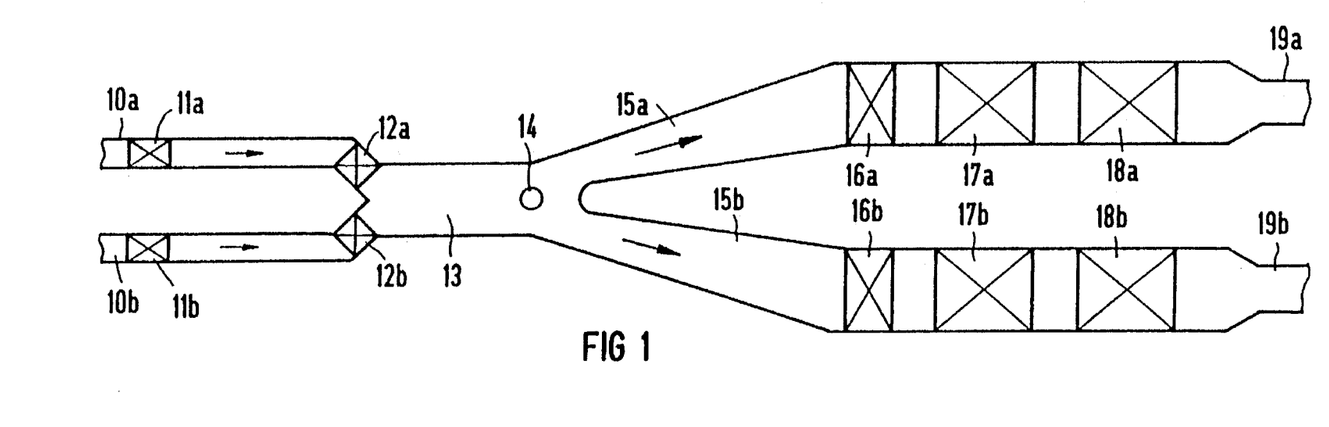
FIG. 1 is a diagrammatic view of a partly dual exhaust gas system of a motor vehicle, with various locations for the starting and main catalysts.

Referring now to the figures of the drawings in detail and first, particularly, to FIG. 1 thereof, there is seen a partly dual exhaust gas system of a motor vehicle. The description given below is equally applicable to single systems, however, in which the lower branch $10b$, $11b$, $12b$, $15b$, $16b$, $17b$, $18b$, $19b$ is omitted. The exhaust gas system carries the exhaust gases by engine outlet lines $10a$, $10b$, to a mixing segment 13, in which a lambda sensor 14 is disposed. From there, exhaust gas lines $15a, b$ lead to the main catalysts $17a$, $17b$, $18a$, $18b$ and from there to tail pipes $19a$, $19b$. Whether the main catalysts comprise only a single body or two bodies, as shown, depends on the size and power of the engine. Three possible positions are shown for electrically heated starting catalysts in FIG. 1. Position 1 is marked $11a$, $11b$; position 2 is marked $12a$, $12b$; and position 3 is marked $16a$, $16b$. The advantages and disadvantages of these positions will be discussed individually below, but combinations are also possible in which two of these positions or all of them are equipped with heated catalysts. It is also possible to heat the main catalysts $17a$, $17b$, $18a$, $18b$ themselves electrically, which may require more electrical power but has the advantage of possibly making starting catalysts unnecessary.

Position 1 is the typical disposition for starting catalysts, in which the catalysts, because they are so close to the engine, are heated rapidly and therefore respond early, but in that case must also withstand major thermal alternating strains. By electric heating, the response behavior in this position can be improved further but the subsequent exhaust gas path to the position of the main catalysts is relatively long, so that shortly after the onset of operation until they reach the main catalysts the exhaust gases can cool down again so far that the response behavior of the main catalysts is improved to only a limited extent.

Position 2 is located somewhat farther from the engine, on the one hand, so that the thermal alternating strains of the catalyst carrier bodies are lessened, and on the other hand closer to the main catalyst, so that its response behavior is already improved somewhat. Additionally, position 2 has the advantage that the catalysts that respond early there improve the response behavior of the lambda sensor 14.

Position 3 is favorable for making the response of the main catalysts $17a$, $17b$, $18a$, $18b$ fast along with the response of the starting catalysts $16a$, $16b$. However, because of the distance from the engine, the starting catalysts do not respond until somewhat later in this position, despite being heated.

In each of the positions shown, starting catalysts and in particular electrically heatable starting catalysts have considerable advantages, however, so that it depends on the individual peripheral conditions which of the positions or which combination of these positions is particularly favorable. Nor is it decisive whether the carrier bodies of the main catalysts are ceramic or metal carrier.

Figure 2:
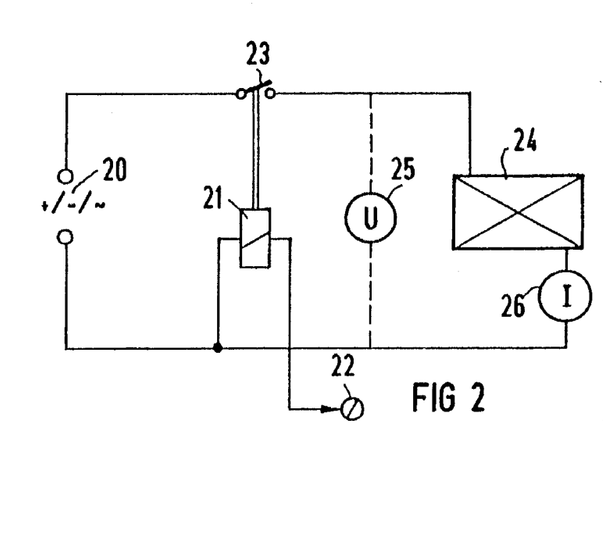
FIG. 2 is a basic diagram of a circuit for electrically heatable catalysts.
Figure 3:
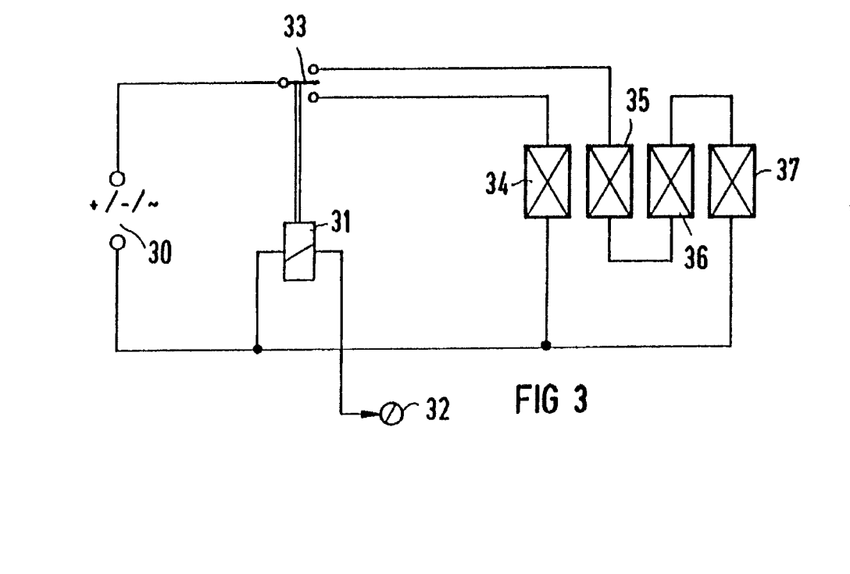
FIG. 3 is a basic diagram of a circuit for catalysts heatable disk by disk.

In FIGS. 2 and 3, schematic basic circuits for electrically conductive or heatable catalysts are shown. In FIG. 2, the heatable catalyst 24 is supplied with current from a current source 20 via a switch 23. Here as in the ensuing discussion, the algebraic sign +/−/~ means that for the essence of the invention it does not matter whether the current supply is from a battery with direct current or from a generator with alternating current. Generally, once certain operating states are attained, further electric heating of the catalyst will no longer be necessary, and for this reason the switch 23 is coupled to a timing relay 21 and to the ignition key 22. With the apparatus shown in FIG. 2, it is possible in principle, and this is an essential point of the present invention, to draw conclusions as to the present (i.e. temperature-dependent) resistance R(T) of the catalyst 24 at that time. In the simplest case, the resistance R can be determined by a voltage measurement 25 and a current measurement 26 from the equation R=U/I (U=voltage; I=current), possibly with the prerequisite that the voltage is constant and known. The resistance R is turn directly proportional to the temperature $T_K$ of the catalyst carrier body. It thus becomes possible to have self-regulation of the heating process, because the heating process is ended once the current drops below a predetermined current $I_{min}$, because in that case a sufficiently high temperature $T_K$ has been attained. It is also possible, by briefly switching on the heating current and measuring it at regular intervals (or by means of some other resistance measuring system), to ascertain whether the temperature $T_K$ of the catalyst is still above the ignition temperature $T_Z$ of the catalytic conversion. If it is not, electric heating can be performed again. Furthermore, picking up the behavior of the resistance R of the catalyst carrier body with respect to time (in the vehicle itself or in a test at the repair facility) makes it possible to draw a conclusion as to the functional condition of the catalyst, because the onset of the exothermic catalytic reaction makes itself felt by a rapid increase in the resistance R. A corresponding indicator in the vehicle, such as a green light, is easily realized.

In FIG. 3, an electrically heatable catalyst is again supplied with current from a current source 30 via a switch 33, which is connected to the ignition key 32 via a timing relay 31. However, in this exemplary embodiment the catalyst comprises a plurality of individually heatable subzones 34, 35, 36, 37; the first subzone 34 can be heated individually and with a higher current, and the other subzones 35, 36, 37 are activated only later, preferably in a series circuit.

Figure 4:
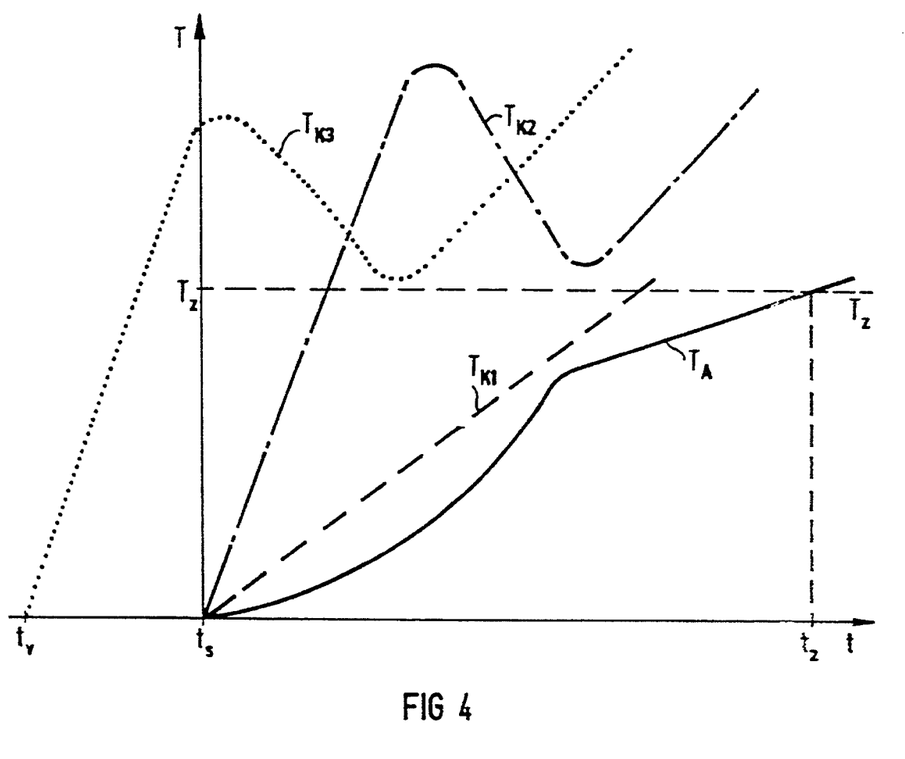
FIG. 4 is a graph of the temperature (T) over time (t) in the exhaust gas or catalyst system of a motor vehicle starting at t=0 at the start of engine operation.

As will be explained in conjunction with FIG. 4, various alternative systems can be used in the operation of electrically heatable catalysts. In the diagram of FIG. 4, the temperature T is plotted on the ordinate, over the time t on the abscissa. $T_Z$ indicates the ignition temperature of a typical catalyst, for instance approximately 3503C, and $t_z$ indicates the instant of ignition, that is, the instant at which, without any auxiliary measures, the catalytic reaction begins to achieve a significant extent. The curve $T_A$ shows the course of the exhaust gas temperature upstream of the catalyst as a function of time after the engine has been turned on at time $t_s$. The curve $T_{K1}$ shown in dashed lines shows the course of temperature in an electrically heated catalyst carrier body. If the heating capacity for a catalyst carrier body is selected such that its temperature $T_{K1}$ is always somewhat above the exhaust gas temperature $T_A$, then the withdrawal of heat from the exhaust gas for heating the catalyst carrier body is avoided. Although the exhaust gas itself cannot be significantly heated with the electrical power, nevertheless cooling is avoided. In this mode of operation, the ceramic and catalytically active mass of the catalyst is heated simultaneously from outside by the exhaust gas and from inside by the catalyst carrier body, and as a result attains the temperature $T_Z$, at which the (exothermic) reaction ensues, markedly earlier, and then itself assures further heating. Because the available electric power for heating the catalysts is not arbitrarily high, it may be necessary, as in a circuit in FIG. 3, to initially heat only one subzone, namely the forwardmost disk of a catalyst that for instance is approximately 3.5 to 6 cm in axial height, in order to bring about the exothermic reaction there as fast as possible. One possible temperature course for this disk is the curve marked $T_{K2}$. The temperature is increased very markedly, for instance to 600 3C, with a high short-circuiting current that is limited to a small subzone, and then a switchover is made to heating of the other catalyst subzones. As a result, although the first disk does cool down somewhat, nevertheless if there is sufficient preheating it no longer drops below the ignition temperature and therefore keeps the exothermic reaction with the exhaust gas going, which in turn has a favorable effect on the response behavior of the ensuing subzones. The curve $T_{K3}$ shows the temperature course of a catalyst carrier body preheated prior to starting of the engine. From the beginning of the preheating at time $t_v$ up to the starting instant $t_s$, the temperature increases steeply to above the ignition temperature $T_Z$ and does not drop below that temperature during engine operation following $t_s$.

At this point, some basic considerations relating to electric heating of catalysts will be introduced. The following points should be taken into account:

a) The total power consumption of catalysts which are to be preheated prior to starting the engine, must be dimensioned such that the waiting time does not become too long, yet the battery is not too heavily drained. Depending on the concept applied, current consumption is in the order of approximately 40 to 400 A (in 12 V systems), in order not to overload the battery and nevertheless markedly influence the response of the catalysts.

b) In case the catalysts are not heated until after the engine is started, they can be supplied for longer or with higher power, but the allowable strain on the generator and the maximum useful current intensity in terms of the cabling required must be taken into account. In particular, aspects of fire safety for the electrical systems must be considered.

On these pre-conditions it can be assumed that for electrical heating of catalysts with electrical systems using 12-volt voltage, current intensities of approximately 5 to 400 A will be needed to heat catalysts or individual catalyst subzones. This means that the electrical resistance of the current paths serving to heat the catalysts, as already explained in the introductory part of the specification, must not exceed or drop below predetermined values. With catalyst carrier bodies made up of individual sheet-metal layers, the following equation can be given for the resistance R:

$$R = \frac{\rho \times L}{z \times b \times h}$$

where $\rho$= specific electrical resistance
L= layer length (may vary for smooth and corrugated sheets)
b= foil thickness
h= foil height
z= number of layers If a catalyst is made up of N catalyst disks of height h, then the resistance in a series circuit should also be multiplied by N.

For the heat generated in a conductor/resistor by a current I, the following equation applies:

$$Q = U \cdot I \cdot t = I^2 \cdot R$$

where Q=quantity of heat
U= voltage
I= current
t= time
R= resistance

For the quantity of heat required to heat a body to the temperature T, the following equation applies:

$$Q = c \cdot m \cdot \Delta T$$

where c= specific heat
m= mass
$\Delta T$=temperature difference,
from which follows a heatup time by purely electric resistance heating of $$tel = \frac{c \times m \times \Delta T}{U \times I}.$$

The actual heatup time which includes the of heat supplied to the catalytic converter from the waste heat of the engine, is markedly shorter, empirically found to be only about x $t_{e1}$.

The exemplary embodiments of the invention that are described below illustrate various options for making up catalyst carrier bodies of metal sheets in such a way that current paths having a suitable resistance for electric heating are created. The invention is not limited to the exemplary embodiments but instead encompasses modifications within the competence of one skilled in the art and embodiments equivalent to the state of the art.

In particular, the sheet-metal layers need not be alternatingly arranged smooth and corrugated layers; sheets structures in other ways may also be used, of the kind known in many variations in the art.

Figure 5:
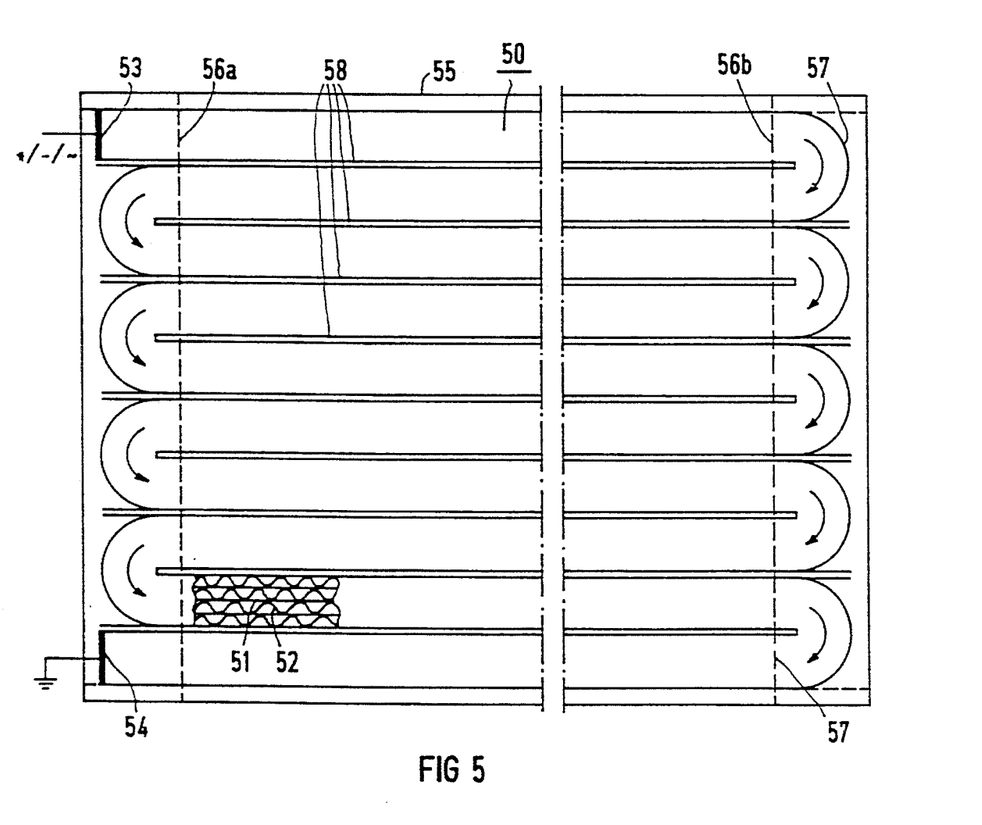
FIG. 5 is an elevational, cross-sectional view of a catalyst carrier body layered in meandering form.

FIG. 5 shows a catalyst carrier body 50 with meandering layers, comprising a stack of smooth sheets 51 and corrugated sheets 52 with successive fanlike folds 57. In the present exemplary embodiment, the stack is formed of four corrugated layers of sheets 52 and three smooth layers of sheets 51; the top and bottom layers of the stack are corrugated sheets. Between each of the meandering loops are electrically insulating intermediate layers 58, with present a direct electrical contact between the individual meandering loops. At the end of the stack, its sheets are each conductively joined together and provided with a current feed line 53 and a current drain line 54, or connection elements suitable for these purposes. The entire body is disposed in a housing or jacket tube 55. At the face ends, the region of the turnaround points 57 has peripheral covers 56a, 56b indicated in dashed lines, which on the one hand prevent undesirable currents between the turnaround points or folds 57 and the housing 55 and on the other hand fix the meandering loops and insulating intermediate layers 58. The resistance of such an apparatus can be varied within wide limits by means of the number of sheets in the meandering stack of sheets. Moreover, non-rectangular cross sections can also be filled with this type of construction.

Figure 6:
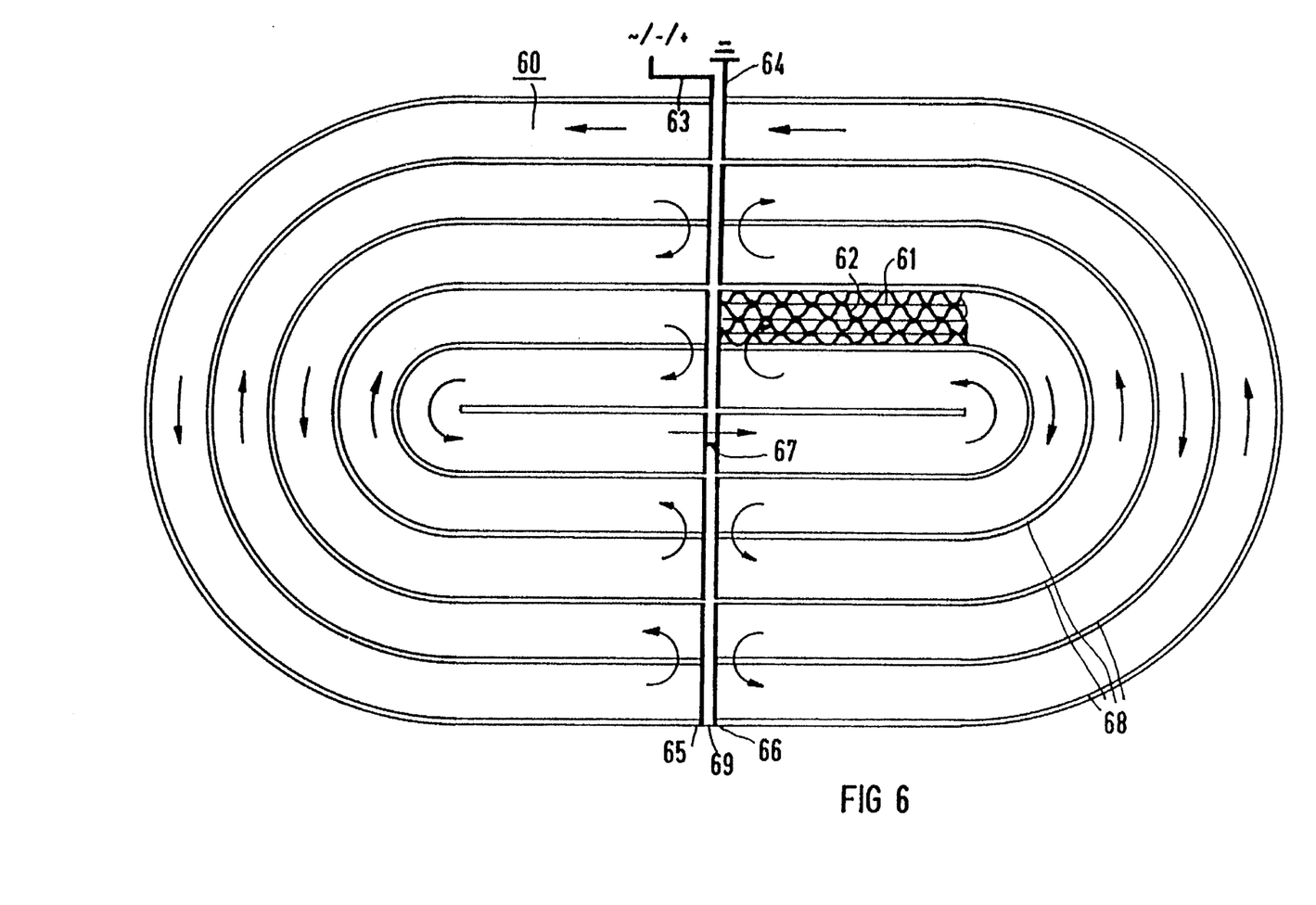
FIG. 6 is a view similar to that of FIG. 5 of a catalyst carrier body with sheet-metal layers extending in a U shape and corresponding current paths.

FIG. 6 by way of example shows a catalyst apparatus, known per se, with smooth sheet layers 61 and corrugated sheet layers 62 bent into a U, which are secured at their ends to a supporting or carrier wall 65, 66, 69. According to the invention, this apparatus is likewise subdivided, by insulating intermediate layer 68 and a specialized subdivision of the supporting wall 65, 66, 69, into electrically conducting segments 65, 66 and an electrically insulating structure 69, such that current paths with a suitable resistance are produced. As the arrows indicate, the current flows successively through various groups of U-shaped sheets adjacent to one another; electrically conductive segments of the supporting wall in each case furnish the connection to the next group. In the interior of the body, the supporting wall has an electrical through connection 67 to an electrically conductive segment disposed opposite thereof, so that groups of U-shaped sheets located on both sides of the supporting wall 69 are included in the power supply. The current drain line 64 in this exemplary embodiment is disposed near the current feed line 63. The entire catalyst carrier body 60 may also need to be disposed in a non-illustrated jacket tube, which has to be insulated from the outermost sheet-metal layers, and through which the current feed line 63 and current drain line 64 may have to be passed in an insulated manner.

Figure 7:
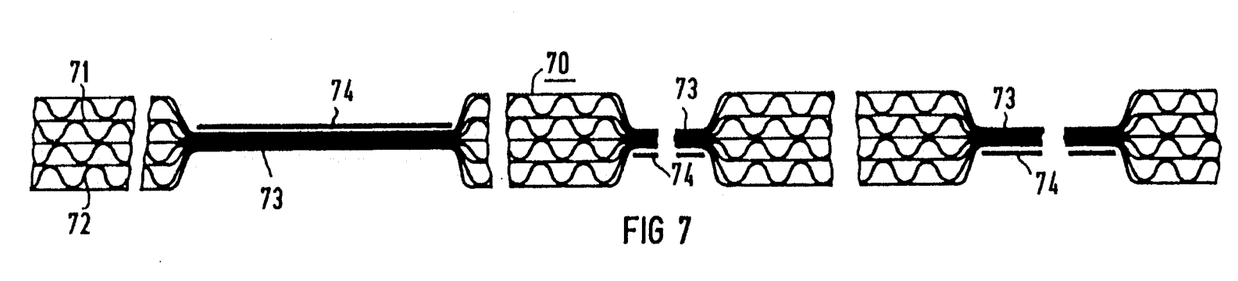
FIG. 7 is a diagrammatic view of a stack of metal sheets with constrictions.
Figures 8, 9:
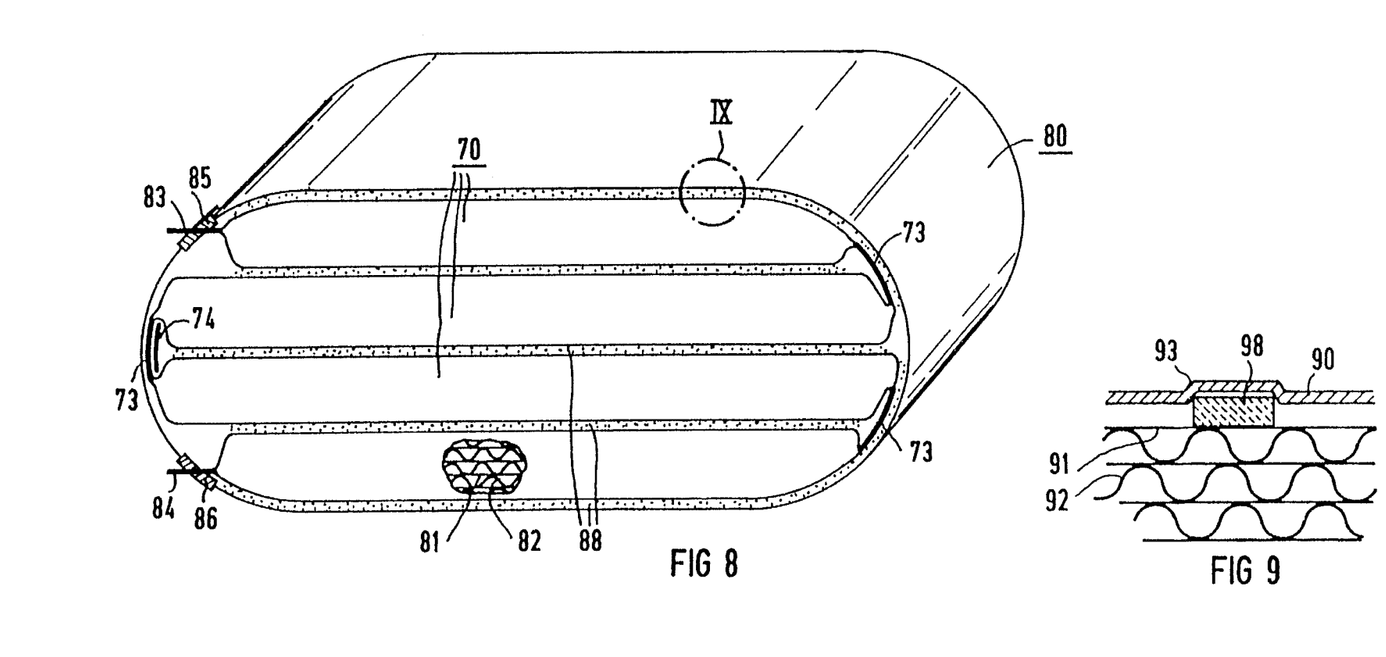
FIG. 8 is a partly perspective view of a meandering-layered catalyst carrier body made from the stack of sheets according to FIG. 7, including a jacket tube.
FIG. 9 is a slightly enlarged detail of FIG. 8 illustrating the insulation of the stack of sheets relative to the jacket tube.

A further exemplary embodiment of the invention is shown in FIGS. 7, 8 and 9. FIG. 7 shows part of a very highly elongated sheet-metal stack 70, of which at least segments are made up of smooth sheet-metal strips 71 and corrugated sheet-metal strips 72. This stack has constrictions 73 disposed at intervals. Such constrictions can be made either if the corrugated sheets 72 are intermittently not corrugated, or by crimping the stack together in the desired regions. For instance, it is also possible to make such a stack initially without constrictions and to braze or solder it at the contact points between the smooth sheets 71 and corrugated sheets 72 and only then to form the constrictions by means of crimping.

From a thus-embodied stack, a catalyst carrier body 80 of the kind shown in FIG. 8 can be constructed. In principle, this is once again a meandering layering, except here the turnaround points are embodied by the constrictions 73 of the stack 70. In this way, desired cross-sectional forms are easier to achieve, and irregularly embodied peripheral regions are reduced in size. The smooth sheets 81 and corrugated sheets 82 of the stack are electrically conductively joined at the ends and terminate in a current feed line 83 or a current drain line 84, respectively, which are passed through insulating elements 85, 86 through a jacket tube surrounding the body. The individual meandering loops and the outside of the stack as well are electrically separated from one another and from the jacket tube by means of insulating layers 88.

FIG. 9 shows an enlarged detail of FIG. 8, with an example of possible insulation from the jacket tube. The jacket tube 90 may for instance have recesses or pockets 93, into which small ceramic plates or platelets 98 are set and/or brazed or soldered there. These ceramic platelets 98 keep the stack of smooth sheets 91 and corrugated sheets 92 spaced away from the jacket tube 90; as a result, both electrical insulation and thermal isolation are attained. Ceramic fiber mats or other ceramic materials are also possible insulating materials, however.

Figure 10:
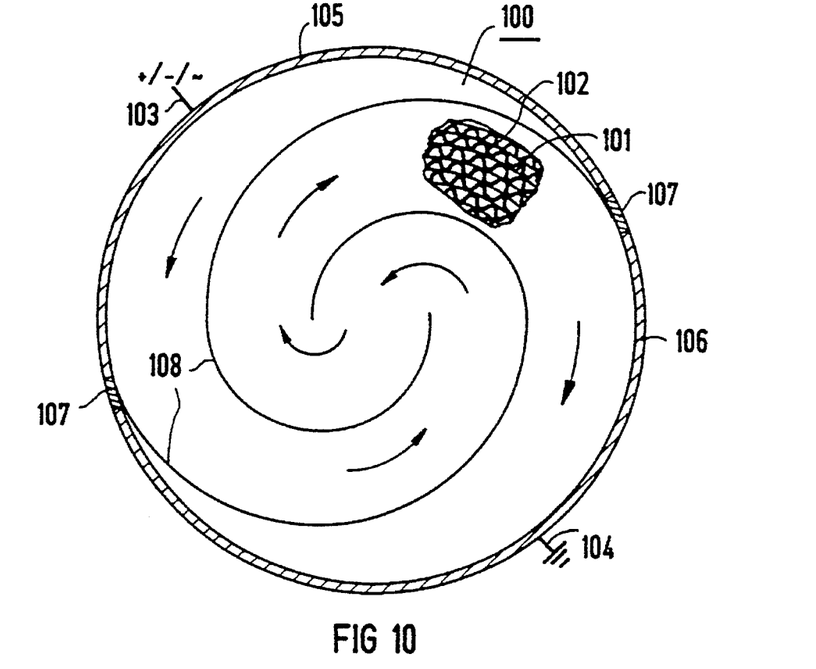
FIG. 10 is a cross-sectional view of an electrically heatable catalyst carrier body with a contrarily entwined stack of sheets (S form) with insulating intermediate layers.

FIG. 10 shows a further, particularly advantageous embodiment of the invention, namely a catalyst carrier body 100, including a stack of smooth sheets 101 and corrugated sheets 102 entwined in contrary directions. This construction of catalyst bodies is known per se and is often called the S-form. This embodiment offers the opportunity of providing the top and bottom of the stack with insulating layers 108 or an insulating coating, as a result of which, when the stack is entwined in contrary directions, a relatively long electrical current path, as indicated by arrows, is created. Its length depends on the ratio on the height of the initial stack to the diameter of the catalyst carrier body. If the sheet-metal layers 101, 102 are secured by the ends to electrically conducting half-shells 105, 106 that are insulated from one another, then a current feed line 103 and a current drain line 104 can be attached to these half-shells. To this end, the half-shells 105, 106 must be separated from one another, for instance by insulator elements 107; the insulating layers 108 must terminate precisely in the region of these insulator elements 107. The entire apparatus is typically also accommodated in a jacket tube, not illustrated in FIG. 10, in an electrically insulated manner; the current feed line 103 and the current drain line 104 must be passed through the jacket tube in an insulated manner. Generally, the current drain line can be dispensed with in practically all embodiments, if a highly conductive connection with the housing and thus to ground of the motor vehicle is established. With contrarily entwined sheets, many other cross sections can also be filled out in a manner known per se, so that this exemplary embodiment is not limited to round cross sections.

Figure 11:
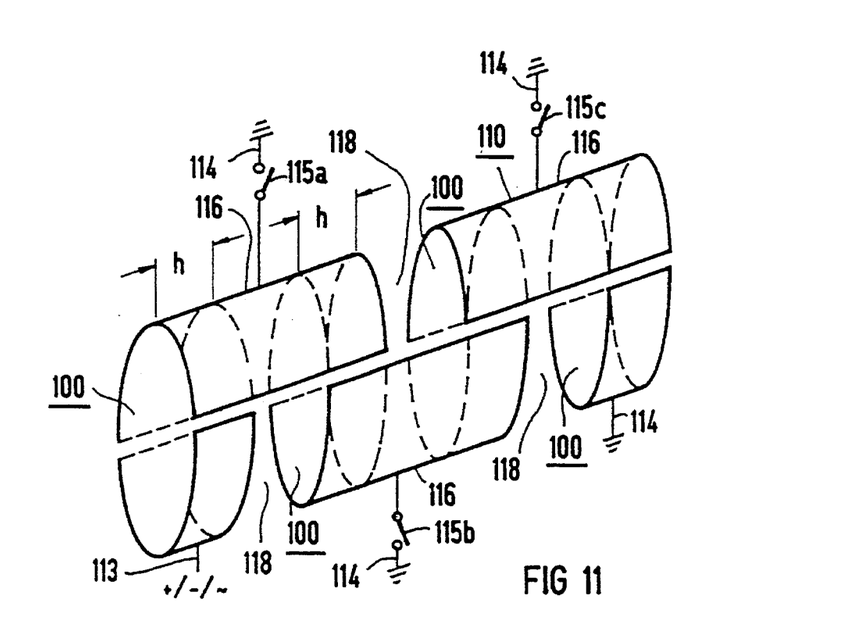
FIG. 11 is a perspective view of a multi-disk catalyst composed of catalyst bodies shown in FIG. 10, including schematic illustrations of the electric connection.

If the attainable electric resistance of an electrically heatable catalyst carrier body structured in accordance with FIG. 10 is not high enough in view of the desired axial length, then a plurality of in-line disks can be connected together, for instance in accordance with FIG. 11. The exemplary embodiment shown therein includes four disks 100 of height h connected in series and embodied in accordance with FIG. 10; the series circuit of the various disks is indicated in each case by two half-cylinder shells 116, each encompassing two disks. The entire body has a current feed line 113 and up to four current drain lines 114, each of which can be activated or deactivated via short-circuit switches 115a, 115b, 115c. Gaps 118 between the individual disks 100 provide for the electric insulation in the axial direction, while the entire body can in turn be accommodated in an electrically insulated manner in a non-illustrated jacket tube. The schematically indicated electric circuit of this apparatus enables the following mode of operation:

At the beginning, the disk 100 that is forwardmost in the flow direction of the exhaust gas can be acted upon alone, by closing the switch 115a; the very high current corresponds to the resistance of the disk. The disk, therefore, is heated quickly in accordance with left-hand side of the curve $T_{K2}$ of FIG. 4. Once a certain time interval, such as 10 seconds, has elapsed, the switch 115a can be opened, so that with the switches 115b, 115c opene, all the disks receive a heating current, reduced by a factor of 4, for further heating. Individually opening the switches 115a, 115b and 115c successively at given time intervals is also possible, for heating the catalyst disk by disk with decreasing power. This enables fast startup of the catalyst, while at the same time the current consumption is high only for a short period of time.

Figure 12:
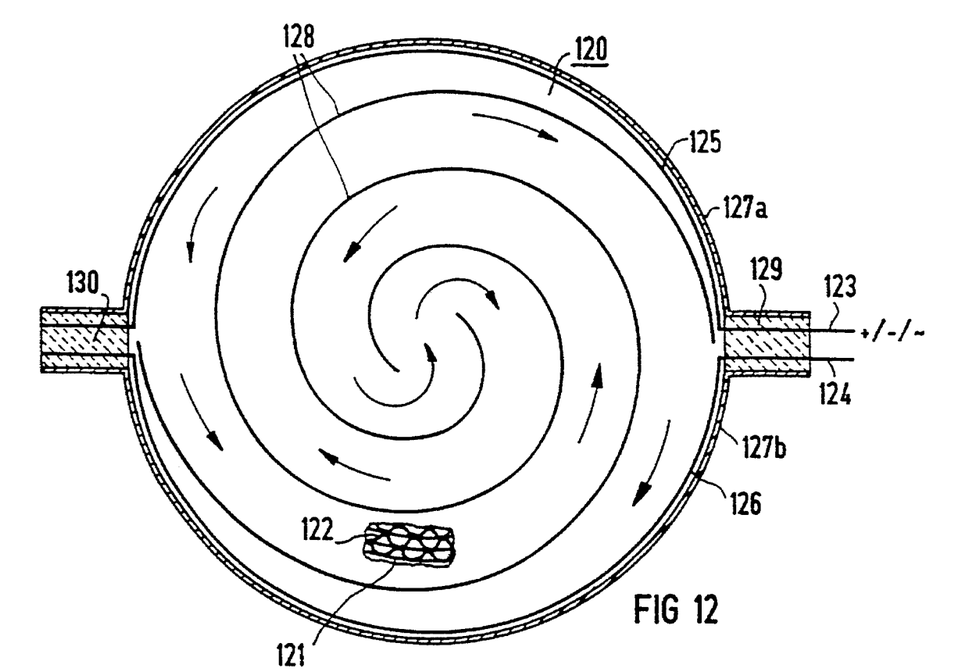
FIG. 12 is a cross-sectional view of a further catalyst carrier body comprising contrarily entwined sheets disposed in a jacket tube and the electrical connections.
Figure 13:
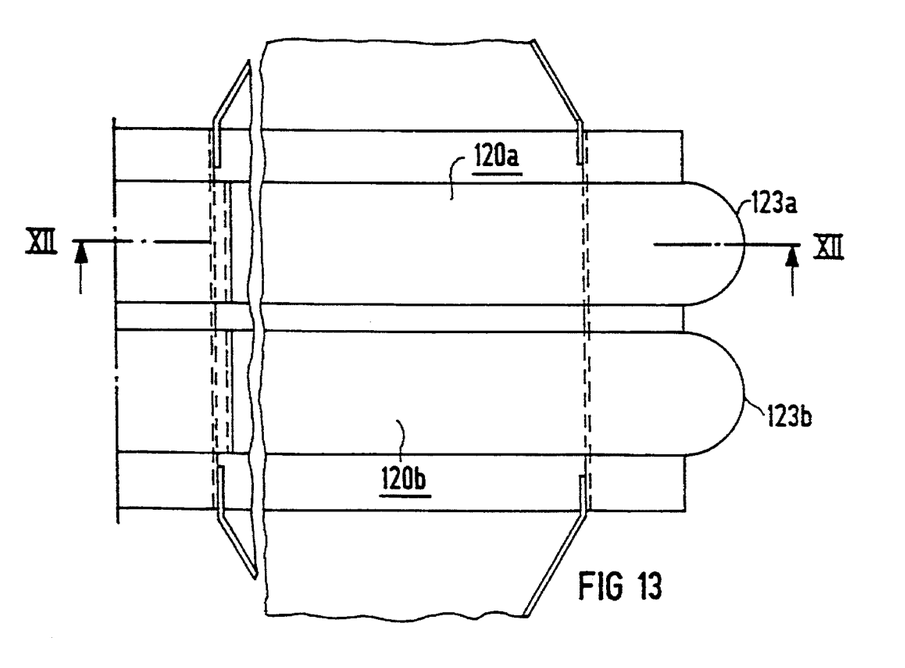
FIG. 13 is a longitudinal-axial sectional view through a catalyst carrier body made from two disks of FIG. 12.

FIGS. 12 and 13 again show an S-shaped, electrically heatable catalyst carrier body in a cross section (FIG. 12) and a longitudinal section (FIG. 13). In FIG. 12, not only the actual catalyst carrier body 120, equivalent to FIG. 10, comprising contrarily entwined smooth sheets 121 and corrugated sheets 122, but also the fastening of the systems and the connections in a jacket tube 127a, 127b is shown. The jacket tube comprises two half-shells 127a, 127b, which are electrically separated from one another by ceramic insulators 129, 130. Extending inside these half-shells 127a, 127b and insulated electrically from them are further half-shells 125, 126, which are connected to the current feed line 123 and current drain line 124, respectively. The electrical construction and the insulating layers 128 are equivalent to those of FIG. 10. The lines 123, 124 are ducted to the outside through the ceramic element 129. As can be seen from FIG. 13, two such catalyst carrier bodies 120a, 120b can for instance be accommodated in line and connected electrically in series in one jacket tube.

Figure 14:
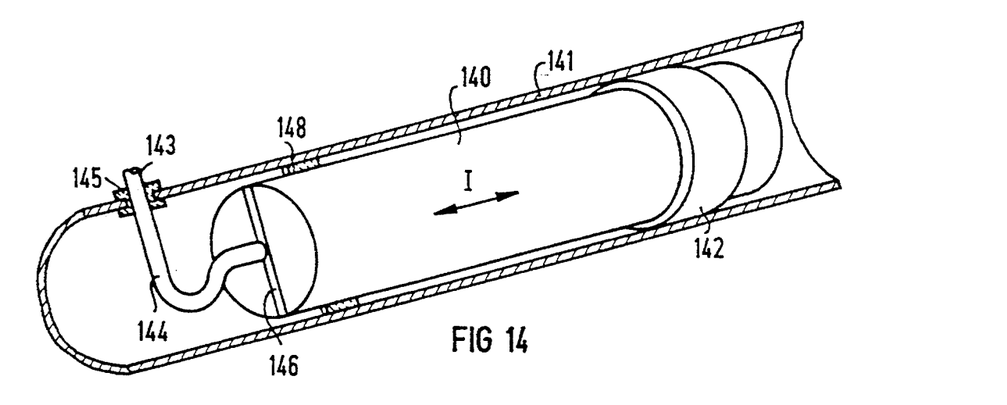
FIG. 14 is a partly broken-away, longitudinal-sectional view of an embodiment of electrically conductive catalyst carrier bodies shown schematically.

FIG. 14 shows as an exemplary embodiment a catalyst carrier body 140 through which current I (see arrow) flows essentially in the axial direction, possibly in meandering form, and also shows its fastening in a jacket tube 141, shown in longitudinal axial section. At one end, the catalyst carrier body 140 is joined in a highly conductive manner, for instance via a metal ring, to the jacket tube 142. The other end is separated from the jacket tube 141 by electrically insulating spacers 148, which form a kind of sliding connection. This face end, or both face ends, have an electrically highly conductive connecting strut 146, which promotes a more-uniform induction of a high electrical current I into the catalyst carrier body 140. The connecting strut 146 protrudes in the axial direction some distance, for example approximately 3 to 10 mm, into the catalyst carrier body 140 and is highly conductively joined, for instance by brazing, to the metal sheets thereof. An electrical feed line 143 is highly conductively secured to the connecting strut 146 and is ducted to the outside through an insulating duct 145 through the jacket tube 141. The feed line 143 has an elastically deformable region 144, which is capable of compensating for thermal expansions in the length of the catalyst carrier body 140 relative to the jacket tube 141. The feed line 143, 144 may for instance be made of a thick, bent sheet-metal strip of high-temperature corrosion-proof material.

Figure 15:
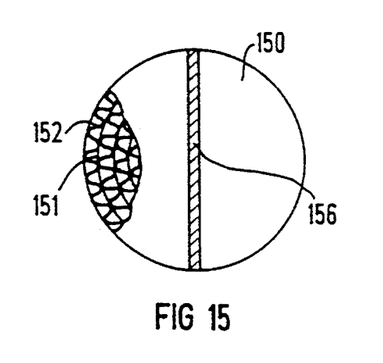
FIG. 15 is a partly broken-away view of a connecting strut on the face end.
Figure 16:
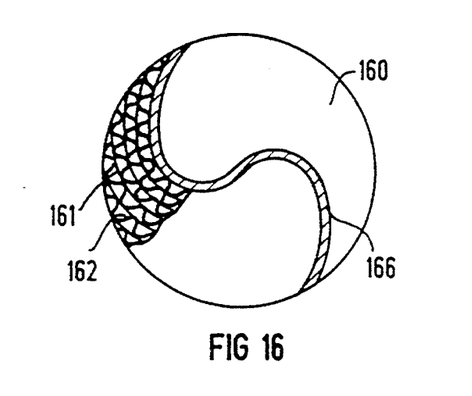
FIG. 16 is a view similar to FIG. 15 of a second embodiment of a connecting strut on the face end.

FIGS. 15 and 16 show various embodiments for fastening connecting struts to the face end of a catalyst carrier body. In the catalyst carrier body 150 of FIG. 15, which is wound from smooth sheets 151 and corrugated sheets 152, a straight strut 156 is inserted into a corresponding slit in the end face. FIG. 16 shows the end face of a catalyst carrier body 160 of structured sheets 161 and 162 entwined approximately in an S shape. The connecting strut 166 is then likewise S-shaped. Such a structure is created for instance if the connecting strut 156 (166) is inlaid with the stack of metal sheets from which an S-shaped catalyst carrier body is created, by entwining the ends of the stack.

Figure 17:
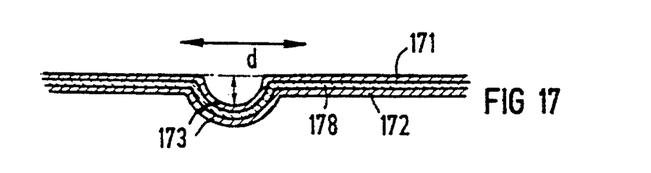
FIG. 17 is a sectional view of an electrically insulating form-locking connection between two sheet-metal layers.

FIG. 17 is a schematic view of a form-locking connection of two sheet-metal layers 171, 172 electrically insulated from one another, which is capable of absorbing forces in the axial direction, represented by an arrow. As mentioned earlier in the text, a form-locking connection is one which is connects two elements together due to the shape of the elements themselves, as opposed to a force-locking connection, which locks the elements together by force external to the elements. This figure shows a longitudinal section through two sheet-metal layers 171, 172 touching one another, in the region of one such form-locking connection 173. A form-locking connection of this kind can for instance be created by grooves extending approximately cross-wise to the longitudinal direction of the catalyst carrier body, or by individual beads. An insulating layer 178, for instance of ceramic material, separates the two sheet-metal layers 171 and 172 from one another. As long as the depth d of these grooves or beads or the like is greater than the thickness of the insulating layer 178, this layer does not undergo tensile strain but essentially only compressive strain upon axial strains to the form-locking connection 173; as a result, great strength of the connection in the axial direction is attained.

The present invention and the exemplary embodiments described are in principle suitable both for electrically heating starting catalysts and for heating main catalysts, as long as enough electric power is available. A plurality of catalyst carrier bodies can be interconnected parallel or in series, depending on given conditions and dimensions. With the engine running and current generated by the generator, the catalysts can also be heated directly by alternating current, and as a result not all the required power needs to be rectified first. In contrast to other electrical devices in the vehicle, the catalyst carrier bodies are insensitive to voltage fluctuations and may if necessary be supplied by an unregulated additional voltage supply. The electrically heatable catalyst carrier bodies according to the invention are suitable for reducing toxic emissions, when particularly stringent requirements for emissions in the cold-starting phase of a vehicle are imposed. The honeycomb bodies described are primarily used in automobile catalysts, but other applications, such as heaters or evaporators for fluids, are also possible.

We claim:

1. A honeycomb body assembly, comprising an electrically conducting honeycomb body having an axial length and metallic structures having walls defining a multiplicity of channels through which a fluid can flow generally in an axial direction, said walls of said metallic structures having a thickness of substantially 0.03 to substantially 0.12 mm and defining catalytically active surfaces in said channels, and means disposed inside said honeycomb body for partially electrically dividing said honeycomb body and forming an electric current path through said metallic structures having an electric resistance of between substantially 0.03 and substantially 2 $\Omega$.

2. The assembly according to claim 1, wherein said insulating means are in the form of intermediate layers disposed between said metallic structures.

3. The assembly according to claim 1, wherein said honeycomb body is divided into disks being mutually spaced apart in the axial direction defining gaps therebetween along the axial length of said honeycomb body, said gaps providing said insulating means.

4. The assembly according to claim 1, wherein said sheet-metal layers are alternating smooth and corrugated sheet-metal layers.

5. The assembly according to claim 1, wherein said electric resistance is between substantially 0.1 and substantially 1 $\Omega$.

6. The assembly according to claim 5, wherein said electric resistance is substantial 0.6 $\Omega$.

7. A honeycomb body assembly, comprising an electrically conducting honeycomb body having an axial length and metallic structures having walls defining a multiplicity of channels through which a fluid can flow generally in an axial direction, said walls of said metallic structures having a thickness of substantially 0.03 to 0.12 mm and defining catalytically active surfaces in said channels, and means disposed inside said honeycomb body for partially electrically dividing said honeycomb body and forming an electric current path through said metallic structures having an electric resistance of between substantially 0.01 and substantially 2 ω.

8. The assembly according to claim 7, wherein said insulating means are in the form of intermediate layers disposed between said metallic structures.

9. The assembly according to claim 7, wherein said honeycomb body is divided into disks being mutually spaced apart in the axial direction defining gaps therebetween along the axial length of said honeycomb body, said gaps providing said insulating means.

10. A carrier body for exhaust gas catalysts, comprising sheet-metal layers being at least partially structured and high-temperature corrosion-proof metallic structures, said metallic structures forming a multiplicity of channels through which a fluid can flow in a general axial direction and defining catalytically active surfaces in said channels, means disposed in said metallic structures for electrically dividing the carrier body cross-sectionally and forming at least one electric current path through said metallic structures, such that the carrier body has an electric resistance of between substantially 0.03 and substantially 2 Ω, wherein said means divide the carrier body into zones being at least partly insulated from one another, said zones forming groups, and including electrical connecting bridges for electrically connecting said groups in series.

11. The carrier body according to claim 10, wherein said insulating means are in the form of intermediate layers disposed between said metallic structures.

12. The assembly according to claim 10, wherein said electric resistance is between substantially 0.1 and substantially 1 Ω.

13. The assembly according to claim 12, wherein said electric resistance is substantially 0.6 Ω.

14. The assembly according to claim 10, wherein said metallic structures have a thickness of substantially 0.03 to substantially 0.06 mm.

15. A honeycomb body assembly, comprising an electrically conducting honeycomb body having an axial length and metallic structures with walls forming a multiplicity of channels through which a fluid can flow generally in an axial direction, said walls of said metallic structures having a thickness of substantially 0.03 to substantially 0.12 mm and defining catalytically active surfaces in said channels, and means disposed inside said honeycomb body for electrically dividing said honeycomb body and forming an electric current path through said metallic structures having an electric resistance of between substantially 0.01 and substantially 2 Ω, wherein said means divide said honeycomb body into zones being at least partly insulated from one another, said zones forming groups, and including electrical connecting bridges for electrically connecting said groups in series.

16. A honeycomb body assembly, comprising an electrically heatable honeycomb body having an axial length and at least partially structured sheet-metal layers forming a multiplicity of channels through which a fluid can flow generally in an axial direction, said sheet-metal layers having a thickness of substantially 0.03 to 0.12 mm, and insulating means disposed inside said honeycomb body for electrically dividing said honeycomb body and forming an electric current path through said sheet-metal layers having an electric resistance of between substantially 0.01 and substantially 2 Ω, said layers forming a stack and said stack including at least four adjacent sheet-metal layers through which current flows parallel, wherein said at least four adjacent sheet-metal layers are accordion-folded and having folds and forming a body, and wherein said electrical insulating means are in the form of intermediate layers.

17. The assembly according to claim 16, wherein said at least four adjacent sheet-metal layers are substantially 8 to 12 sheet metal layers.

18. The assembly according to claim 17, wherein said stack is crimped in the regions of said folds where said at least four sheet-metal layers rest flat against one another.

19. The assembly according to claim 18, including reinforcement means disposed in the region of said folds for lowering the electrical resistance of said folds.

20. A honeycomb body assembly, comprising an electrically heatable honeycomb body having an axial length and at least partially structured sheet-metal layers forming a multiplicity of channels through which a fluid can flow generally in an axial direction, said sheet-metal layers having a thickness of substantially 0.03 to 0.12 mm and defining catalytically active surfaces in said channels, and insulating means disposed inside said honeycomb body for electrically dividing said honeycomb body and forming an electric current path through said sheet-metal layers having an electric resistance of between substantially 0.01 and substantially 2 Ω, wherein said layers have ends and form substantially U-shaped stacks, said stacks being electrically insulated from one another by said insulating means, including a supporting wall to which said ends are attached, said supporting wall including a plurality of electrically conductive segments insulated from one another, each of said segments electrically connecting at least two of said stacks for forming a series circuit through said stacks and said segments.

21. A honeycomb body assembly, comprising an electrically heatable honeycomb body having an axial length and at least partially structured sheet-metal layers forming a multiplicity of channels through which a fluid can flow generally in an axial direction, said sheet-metal layers having a thickness of substantially 0.03 to 0.12 mm and defining catalytically active surfaces in said channels, and insulating means disposed inside said honeycomb body for electrically dividing said honeycomb body and forming an electric current path through said sheet-metal layers having an electric resistance of between substantially 0.01 and substantially 2 Ω, wherein said layers form a stack being entwined to form a body, said stack having a top, a bottom, two ends and a given height, and being provided with electrically insulating layers on said bottom and on said top, and wherein said sheet-metal layers are mutually electrically conductive at least in the region of said ends of said stack, and including electrical connecting means for connecting said ends to a current source.

22. The assembly according to claim 21, wherein said honeycomb body has a substantially circular cross-section with a given diameter, and said given height of said stack being at least as small as one-third the diameter of the cross-section.

23. A carrier body for exhaust gas catalysts, comprising sheet-metal layers being at least partially structured and high-temperature corrosion-proof, said sheet-metal layers forming a multiplicity of channels through which a fluid can flow in a general axial direction and defining catalytically active surfaces in said channels, insulating means disposed between said sheet-metal layers for electrically dividing the carrier body cross-sectionally and forming at least one electric current path through said sheet-metal layers, such that the carrier body has an electric resistance of between substantially 0.03 and substantially 2 Ω, wherein said sheet-metal layers include a stack of at least four adjacent sheet-metal layers through which current flows parallel, wherein said stack of at least four adjacent sheet-metal layers is accordion-folded having folds and forming a body, and wherein said insulating means are in the form of intermediate layers.

24. The carrier body according to claim 23, wherein said stack is crimped at reversing points thereof where said at least four sheet-metal layers rest flat against one another.

25. The carrier body according to claim 24, including reinforcement means disposed in the region of said folds for lowering the electrical resistance of said folds.

26. A carrier body for exhaust gas catalysts, comprising sheet-metal layers being at least partially structured and high-temperature corrosion-proof, said sheet-metal layers forming a multiplicity of channels through which a fluid can flow in a general axial direction and defining catalytically active surfaces in said channels, insulating means disposed between said sheet-metal layers for electrically dividing the carrier body cross-sectionally and forming at least one electric current path through said sheet-metal layers, such that the carrier body has an electric resistance of between substantially 0.03 and substantially 2 Ω, wherein said layers have ends and form substantially U-shaped stacks being electrically insulated from one another by said insulating means, including a supporting wall to which said ends of said layers are attached, said supporting wall including a plurality of electrically conductive segments insulated from one another, each of said segments electrically connecting at least two of said stacks for forming a series circuit through said stacks and said segments.

27. A honeycomb body assembly, comprising an electrically conducting honeycomb body having an axial length and metallic structures with walls defining a multiplicity of channels through which a fluid can flow generally in an axial direction, said walls of said metallic structures having a thickness of substantially 0.03 to 0.12 mm and defining catalytically active surfaces in said channels, and means disposed inside said honeycomb body for electrically dividing said honeycomb body and forming an electric current path through said metallic structures having an electric resistance of between substantially 0.01 and substantially 2 Ω, wherein said honeycomb body is a plurality of honeycomb bodies in the form of disks disposed in line with one another and connected electrically in parallel.

28. A honeycomb body assembly, comprising an electrically conducting honeycomb body having an axial length and metallic structures with walls defining a multiplicity of channels through which a fluid can flow generally in an axial direction, said walls of said metallic structures having a thickness of substantially 0.03 to 0.12 mm and defining catalytically active surfaces in said channels, and means disposed inside said honeycomb body for electrically dividing said honeycomb body and forming an electric current path through said sheet-metal layers having an electric resistance of between substantially 0.01 and substantially 2 Ω, wherein said honeycomb body is a plurality of honeycomb bodies in the form of disks disposed in line with one another and connected electrically in series.

29. A honeycomb body assembly, comprising an electrically conducting honeycomb body having an axial length and metallic structures with walls defining a multiplicity of channels through which a fluid can flow generally in an axial direction, said walls of said metallic structures having a thickness of substantially 0.03 to 0.12 mm and defining catalytically active surfaces in said channels, and insulating means disposed inside said honeycomb body for electrically dividing said honeycomb body and forming an electric current path through said metallic structures having an electric resistance of between substantially 0.01 and substantially 2 Ω, wherein said insulating means are in the form of granular ceramic material, ceramic platelets, and ceramic fiber mats.

30. The assembly according to claim 29, wherein said granular ceramic material is applied to adjacent surfaces of said metallic structures.

31. A honeycomb body assembly, comprising an electrically conducting honeycomb body having an axial length and metallic structures with walls forming a multiplicity of channels through which a fluid can flow generally in an axial direction, said walls of said metallic structures having a thickness of substantially 0.03 to 0.12 mm, and means disposed inside said honeycomb body for electrically dividing said honeycomb body and forming an electric current path through said metallic structures having an electric resistance of between substantially 0.01 and substantially 2 Ω, wherein said honeycomb body has two end faces and current flows therethrough in an axial direction, including at least one electrically highly conductive connecting strut integrated into at least one of said end faces for uniformly distributing the electrical current density over the cross-section of said honeycomb body.

32. The assembly according to claim 31, including a metal jacket tube in which said honeycomb body is disposed, an electrically insulating duct disposed in said jacket tube, and an electrical supply line suitable for currents of substantially between 50 and 400 A leading into said jacket tube through said insulating duct and being connected to said connecting strut, said supply line being high-temperature-proof and being capable of absorbing relative movement between said connecting strut and said insulating duct.

33. The assembly according to claim 31, including a metal jacket tube in which said honeycomb body is disposed, an electrically insulating duct disposed in said jacket tube, and an electrical supply line suitable for currents of substantially between 50 and 600 A leading into said jacket tube through said insulating duct and being connected to said connecting strut, said supply line being high-temperature-proof and being capable of absorbing relative movement between said connecting strut and said insulating duct.

* * * * *